H. D. WEED.
ANTISKIDDING DEVICE FOR DUAL TIRES.
APPLICATION FILED NOV. 19, 1907.
1,147,470.
Patented July 20, 1915.
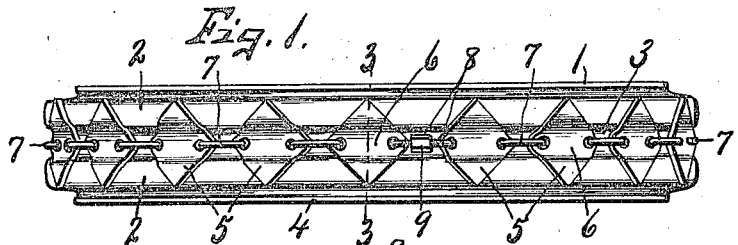
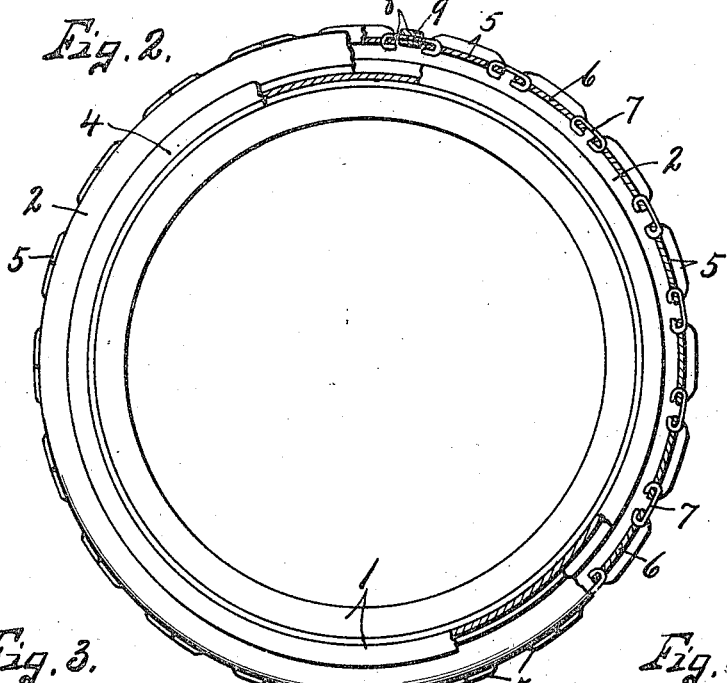
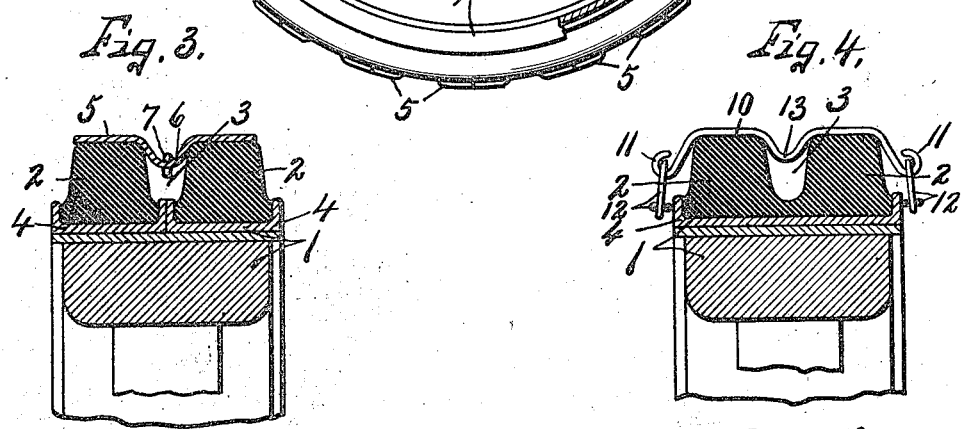

H. D. WEED.
ANTISKIDDING DEVICE FOR DUAL TIRES.
APPLICATION FILED NOV. 19, 1907.
1,147,470.
Patented July 20, 1915.
2 SHEETS—SHEET 2.
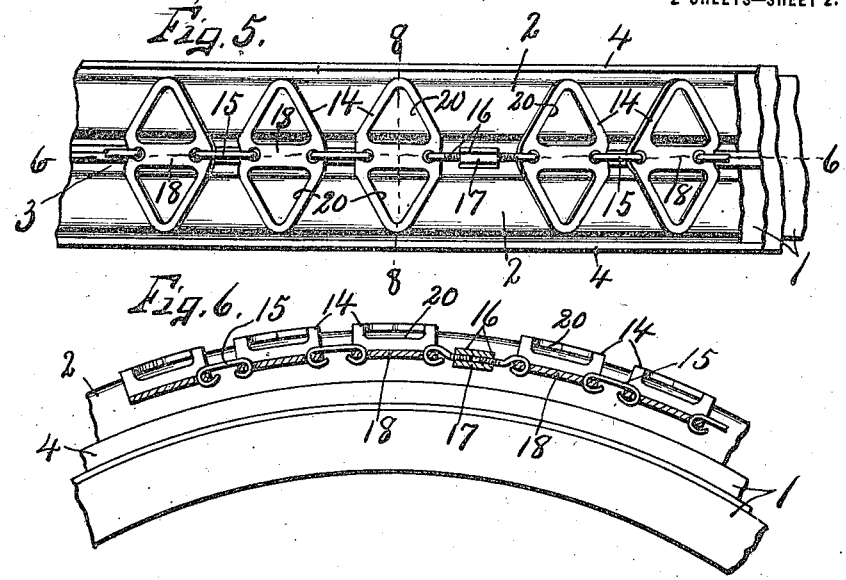
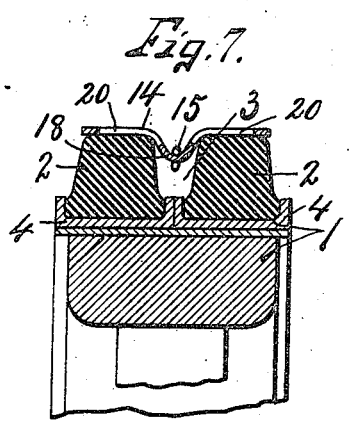

UNITED STATES PATENT OFFICE.

HARRY D. WEED, OF SYRACUSE, NEW YORK, ASSIGNOR TO WALTER B. LASHAR, OF BRIDGEPORT, CONNECTICUT.

ANTISKIDDING DEVICE FOR DUAL TIRES.

1,147,470. Specification of Letters Patent. Patented July 20, 1915.

Application filed November 19, 1907. Serial No. 402,778.

*To all whom it may concern:*

Be it known that I, HARRY D. WEED, of Syracuse, in the county of Onondaga, in the State of New York, have invented new and useful Improvements in Antiskidding Devices for Dual Tires, of which the following, taken in connection with the accompanying drawings, is a full, clear, and exact description.

This invention relates to certain improvements in anti-skidding devices for vehicle wheels having multiple tires, and is particularly adapted for use in connection with dual tires with which the wheels, and especially the traction wheels of many self-propelled vehicles are now equipped. These tires are usually made of solid rubber and are secured side by side some distance apart transversely upon the periphery of the rim or felly of the wheel leaving an annular space between the adjacent faces of the tires.

My main object is to provide a simple, practical and efficient grip-tread which may be easily and quickly applied to or removed from the periphery of both tires simultaneously, and held in place by attaching elements within the wearing surfaces of the gripping elements. In other words, I have sought to utilize the annular space between the tires for the reception of the attaching elements as well as portions of the gripping elements, which are depressed into said space.

It is manifest that many different forms of gripping elements and attaching elements therefor may be used. and that the gripping elements may be either continuous across both tires and the intervening space, or made in separate series, one series for each tire, but in all cases, at least, portions of some of the gripping elements, as well as portions of the attaching elements, are located between the tires of each wheel for retaining the complete anti-skidding device or grip-tread, as it may be termed, in operative position upon the periphery of said tires.

Another object is to provide means also located within the annular groove or space between the tires for taking up the slack of the grip-tread.

A further object is to make the attaching elements located within the annular space separate from the tires so that the entire grip-tread may be free to shift circumferentially relatively to the tires, and still be guided or held in operative position against transverse displacement by the portions of the gripping elements which may be located in such annular space.

In the drawings—Figure 1 is a top plan of a dual-tire vehicle wheel equipped with my improved anti-skidding device. Fig. 2 is a side elevation, partly in section, of the parts shown in Fig. 1. Fig. 3 is an enlarged transverse sectional view taken on line 3—3, Fig. 1. Fig. 4 is a similar transverse sectional view of a modified form of gripping-tread in which the attaching elements are omitted from between the tires and substituted by other circular attaching elements at the outer sides of the tire, although the central portions of the gripping plates are depressed within the annular space between the tires to prevent transverse displacement of said plates. Fig. 5 is an enlarged top plan of a portion of a wheel showing a further modified form of grip-tread. Fig. 6 is a sectional view taken on line 6—6, Fig. 5. Fig. 7 is an enlarged transverse sectional view taken on line 8—8, Fig. 5.

In all of these several views, I have shown a vehicle wheel comprising a rim —1—, upon which is mounted a pair of solid rubber, or elastic tires —2— spaced apart forming an intervening annular groove —3—, the tires —2— being separate and preferably seated in separate channel rings —4— forming a part of the main rim —1—, although in some instances, these tires —2— may be united at the bases of their meeting edges by a comparatively thin web of the same material, as best seen in Fig. 4.

These dual tires are of the same diameter and their peripheries are preferably flat transversely, and while they serve, in a measure, to prevent skidding of the wheels on dirt pavements, they are nevertheless susceptible to the same sliding or skidding difficulties as experienced in the use of single pneumatic tires, and in order to overcome this liability I have provided separately constructed anti-skidding devices or grip-treads, consisting as shown in Figs. 1, 2, and 3, of a circular series of metal treads or gripping plates —5— arranged end to end around and loosely seated upon the peripheries of both tires, said plates being of sufficient transverse width to extend transversely across the treads of both tires and intervening annular space, the central lengthwise portions of said wearing plates being depressed inwardly, forming ribs or shoulders —6—, which project inwardly from the periphery of the tire into the annular groove —3— to retain such plates against transverse displacement, although they are free to shift circumferentially around and upon the tire, and are further held in place by attaching elements —7—, consisting in this instance of links located within the wearing surfaces of the plates —5— and attached to the inwardly projecting shoulders or ribs —6—. In other words, the ends of the wearing plates —5— are flexibly joined together by the attaching elements or links —7—, located within the annular space —3—, thus forming with the wearing plates a continuous flexible armor loosely resting upon the periphery of both tires with their ribs or shoulders —6— and attaching elements —7— located between the tires, and therefore, within the annular space —3—.

In order that the anti-slipping device or grip-tread may be readily removed from or replaced upon the tires, it is necessarily divided at some point in its circumference, and for this purpose I have provided an adjustable connecting link —8— connecting the meeting ends of two of the adjacent plates and provided with an adjusting nut —9—, whereby the connection —8— may be adjusted to not only connect the meeting ends of the complete grip-tread, but also to take up any slack therein.

In Fig. 4 I have shown a wearing plate 10— forming one of a circular series, similar to those shown in Figs. 1, 2 and 3, except that its outer ends are formed with eyes —11— for receiving attaching elements 12—, said attaching elements preferably consisting of circular side chains, similar to those set forth in my Patent No. 768,494 issued August 23, 1904, or of any other well known construction now in use. The feature of novelty, however, of the gripping device shown in Fig. 4, is that the central lengthwise portions of the plates 10— are depressed inwardly forming ribs or shoulders 13— which project into the annular groove —3— between the tires —2—, and thereby aid materially in holding the plates against transverse displacement, while the circular side pieces —12— operate to hold said plates against radial displacement.

In Fig. 5 I have shown a portion of a further modified form of grip-tread consisting of a circular series of transverse plates 14— arranged end to end circumferentially around the periphery of the tire and linked together intermediate their ends by attaching elements 15— and 16—, the attaching elements 15— being similar to those shown in Figs. 1, 2 and 3, while the attaching elements 16— preferably consist of opposed threaded parts connected by a nut —17—, whereby the circular grip-tread may be divided and readily removed from or replaced upon the tire. The particular feature of novelty of this construction lies in extending the plates transversely across and upon both tires, and providing their central portions with inwardly projecting central ribs or shoulders 18— between the meeting faces of the tires in the annular space —3—, and also in locating the attaching elements 15— and 16— within said recess or annular groove —3— beneath the tread-surfaces of the tire where they are protected from wear, and together with the inwardly projecting shoulders —18— aid in preventing transverse displacement of the plates when in use, the links 15— and 16— serving to tie the plates together in circular series forming a continuous grip-tread having its wearing elements loosely seated upon the peripheries of both tires and the attaching elements separate from the tires, and together with the wearing plates are free to shift circumferentially relatively to said tires. The portions of the plates 14— which rest upon the peripheries of the tires are formed with openings —20— leaving a central tie-bar —18—, which is depressed within the annular space —3— and serves to strengthen or reinforce the plate, and to permit the use of comparatively light material.

Although I have described several modified forms of gripping devices as loosely applied to the periphery of the dual tires so that they may shift circumferentially thereon, the main feature of the invention lies in the provision of any circular series of gripping elements applied to the treads of both tires and retained wholly or partially by means located between and within the peripheries of said tires.

What I claim is:

1. In combination with the rim of a vehicle wheel, an elastic tire having multiple treads spaced apart to form an intervening annular groove and having substantially flat tread faces and an anti-skidding device comprising a circular series of substantially rhomboidal metal tread members adapted to creep circumferentially with respect to the tire tread and formed of stamped sheet metal arranged circumferentially around and upon the tire and having their central portions of greater length circumferentially of the device than their lateral portions and having substantially flat portions resting upon the elastic treads of the tire and central securing portions projecting into the groove between the tire treads some distance inside the plane of the flat portions and loose pivotal connections between said tread members to flexibly connect them together, the points of attachment between the tread members and connections being wholly within the plane of the flat portions of said members.

2. In combination with the rim of a vehicle wheel, an elastic tire having multiple treads spaced apart to form an intervening annular groove and having substantially flat tread faces and an anti-skidding device comprising a circular series of substantially rhomboidal metal tread members adapted to creep circumferentially with respect to the tire tread and arranged circumferentially around and upon the tire and having their central portions of greater length circumferentially of the device than their lateral portions and having substantially flat portions resting upon the elastic treads of the tire and central securing portions projecting into the groove between the tire treads some distance inside the plane of the flat portions and connections between said tread members to flexibly connect them together, the points of attachment between the tread members and connections being wholly within the plane of the flat portions of said members.

3. In combination with the rim of a vehicle wheel, an elastic tire having multiple treads spaced apart to form an intervening annular groove and having substantially flat tread faces and an anti-skidding device comprising a circular series of metal tread members adapted to creep circumferentially with respect to the tire tread and arranged circumferentially around and upon the tire and having their central portions of greater length circumferentially of the device than their lateral portions and having substantially flat portions resting upon the elastic treads of the tire and central securing portions projecting into the groove between the tire treads some distance inside the plane of the flat portions and connections between said tread members to connect them together, the points of attachment between the tread members and connections being wholly within the plane of the flat portions of said members.

4. In tire grips for elastic multiple tread wheels, a tire grip comprising a circular series of substantially rhomboidal tread members formed of stamped sheet metal having substantially flat tread portions each having a substantially triangular opening and adapted to rest on the elastic tire treads and integral intermediate securing portions of greater circumferential length bent inward out of line with the tire treads and comprising central alining portions to project within the annular grooves between the multiple tires and metallic link connections flexibly joining said tread members and pivotally attached to said securing portions and located entirely inside the plane of said tread portions.

5. In tire grips for elastic multiple tread wheels, a tire grip comprising a circular series of substantially rhomboidal tread members having substantially flat tread portions adapted to rest on the elastic tire treads and integral intermediate securing portions of greater circumferential length extending inward out of line with the tire treads and comprising central alining portions to project within the annular grooves between the multiple tires and metallic link connections flexibly joining said tread members and located entirely inside the plane of said tread portions.

6. In tire grips for elastic multiple tread wheels, a tire grip comprising a circular series of tread members having substantially flat tread portions adapted to rest on the elastic tire treads and intermediate securing portions of greater circumferential length extending inward out of line with the tire treads and metallic connections flexibly joining said tread members.

7. In combination with the rim of a vehicle wheel, an elastic tire having dual treads spaced apart to form an intervening annular groove and having projecting tread faces to engage the roadway and an anti-skidding device comprising a circular series of metal tread members spaced some distance apart and adapted to creep circumferentially with respect to the tire treads and arranged circumferentially around and upon the tire and having their central portions of greater length circumferentially of the device than their outer lateral portions engaging the roadway and having tread portions resting upon the elastic treads of the tire and having central securing portions projecting into the groove between the tire treads some distance inside the plane of the tread portions and connections between said tread members to connect them together.

8. In tire grips for elastic dual tread wheels, a tire grip comprising a circular series of tread members having tread portions adapted to coöperate with the elastic tire treads and intermediate securing portions of greater circumferential length extending inward out of line with the tire treads and adapted to extend within the annular groove between the dual tire treads and link connections flexibly joining said tread members to space them apart on the tire treads.

9. In tire grips for elastic dual tread wheels, a tire grip comprising a circular series of tread members having angularly arranged lateral tread portions for engagement with the roadway and adapted to cooperate with the elastic tire treads and having intermediate securing portions of greater circumferential length than the outer parts of said tread portions and extending inward out of line with the tire treads and adapted to extend within the annular groove between the dual tire treads and link connections flexibly joining said tread members to space them apart on the tire treads.

In witness whereof I have hereunto set my hand this 14th day of October 1907.

HARRY D. WEED.

Witnesses:
H. E. CHASE,
MILDRED M. NOTT.

Copies of this patent may be obtained for five cents each, by addressing the "Commissioner of Patents, Washington, D. C."